United States Patent
Chun et al.

(10) Patent No.: US 12,475,073 B2
(45) Date of Patent: Nov. 18, 2025

(54) MULTI-COMMAND TRANSACTIONS

(71) Applicant: QUALCOMM Incorporated, San Diego, CA (US)

(72) Inventors: Christopher Kong Yee Chun, Austin, TX (US); Chris Rosolowski, Encinitas, CA (US); Jai Babu Mahankud, Karnataka (IN); Sriharsha Chakka, Karnataka (IN)

(73) Assignee: Qualcomm Incorporated, San Diego, CA (US)

( * ) Notice: Subject to any disclaimer, the term of this patent is extended or adjusted under 35 U.S.C. 154(b) by 25 days.

(21) Appl. No.: 18/600,737

(22) Filed: Mar. 10, 2024

(65) Prior Publication Data
US 2025/0284656 A1 Sep. 11, 2025

(51) Int. Cl.
*G06F 13/42* (2006.01)
(52) U.S. Cl.
CPC .. *G06F 13/4291* (2013.01); *G06F 2213/2418* (2013.01)
(58) Field of Classification Search
CPC .............. G06F 13/4291; G06F 2213/2418
See application file for complete search history.

(56) References Cited

U.S. PATENT DOCUMENTS

| | | | | |
|---|---|---|---|---|
| 2008/0247414 | A1* | 10/2008 | Sheafor | G06F 13/4291 370/438 |
| 2009/0085631 | A1* | 4/2009 | Lambrecht | G06F 13/4291 327/299 |
| 2020/0050571 | A1* | 2/2020 | Bhaskar | H04L 12/18 |
| 2024/0311227 | A1* | 9/2024 | Goyal | G06F 11/263 |

* cited by examiner

*Primary Examiner* — Henry Tsai
*Assistant Examiner* — Aurangzeb Hassan
(74) *Attorney, Agent, or Firm* — Muncy, Geissler, Olds & Lowe, P.C.

(57) ABSTRACT

Various embodiments include methods for implementing command transactions on a two-wire bus system of a computing device, and devices for implementing the methods. Embodiments may include receiving, by a two-wire interface of a host device, an abort signal via a two-wire bus, and transmitting, by the two-wire interface of the host device, an end signal via the two-wire bus in response to receiving the abort signal. Embodiments may further include transmitting, by a two-wire interface of a bus owner device, commands via the two-wire bus prior to receiving the end signal, receiving, by the two-wire interface of the bus owner device, the end signal via the two-wire bus; and terminating, by the two-wire interface of the bus owner device, transmitting commands in response to receiving the end signal. Some embodiments may include transmitting the commands following an instance of bus arbitration and prior to a subsequent instance of bus arbitration.

17 Claims, 10 Drawing Sheets

MULTI-COMMAND TRANSACTIONS

BACKGROUND

Current implementations of two-wire bus systems allow communication between multiple devices of a computing device over a shared two-wire bus. A two-wire bus system implements a process of bus arbitration in which the devices having command transactions to implement via the two-wire bus attempt to gain control (or own) the two-wire bus. The bus owner device of the two-wire bus may implement one command transaction via the two-wire bus followed by another round of bus arbitration. During the subsequent bus arbitration, the previous bus owner device, if still having a command transaction to implement via the two-wire bus, can attempt to regain control of the two-wire bus. The non-bus owner devices, having a command transaction to implement via the two-wire bus, wait until the subsequent arbitration for another attempt to gain control of the two-wire bus.

SUMMARY

Various aspects provide methods include methods and apparatuses for implementing such methods for implementing command transactions on a two-wire bus system of a computing device. Various aspects may include receiving, by a two-wire interface of a host device, at least one abort signal via a two-wire bus, and transmitting, by the two-wire interface of the host device, an end signal via the two-wire bus in response to receiving the at least one abort signal.

Some aspects may further include transmitting, by a two-wire interface of a bus owner device, at least one command via the two-wire bus prior to receiving the end signal, receiving, by the two-wire interface of the bus owner device, the end signal via the two-wire bus, and terminating, by the two-wire interface of the bus owner device, transmission of commands on the two-wire bus in response to receiving the end signal. In some aspects, transmitting, by the two-wire interface of the bus owner device, the at least one command via the two-wire bus prior to receiving the end signal may include transmitting a plurality of commands, including the at least one command, following an instance of bus arbitration and prior to a subsequent instance of bus arbitration. In some aspects, the bus owner device may be a power management integrated circuit (PMIC).

In some aspects, receiving, by the two-wire interface of the host device, the at least one abort signal via the two-wire bus may include receiving the at least one abort signal from a two-wire interface of a bus owner device. In some aspects, receiving, by the two-wire interface of the host device, the at least one abort signal via the two-wire bus may include receiving the at least one abort signal from a two-wire interface of at least one non-bus owner device. In some aspects, the at least one abort signal may be a voltage transition on at least one wire of the two-wire bus.

Further aspects include a computing device including a memory and a processor and/or memory frequency device configured to perform operations of any of the methods summarized above. Further aspects include a non-transitory processor-readable storage medium having stored thereon processor-executable software instructions configured to cause a processor and/or memory frequency device to perform operations of any of the methods summarized above.

Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
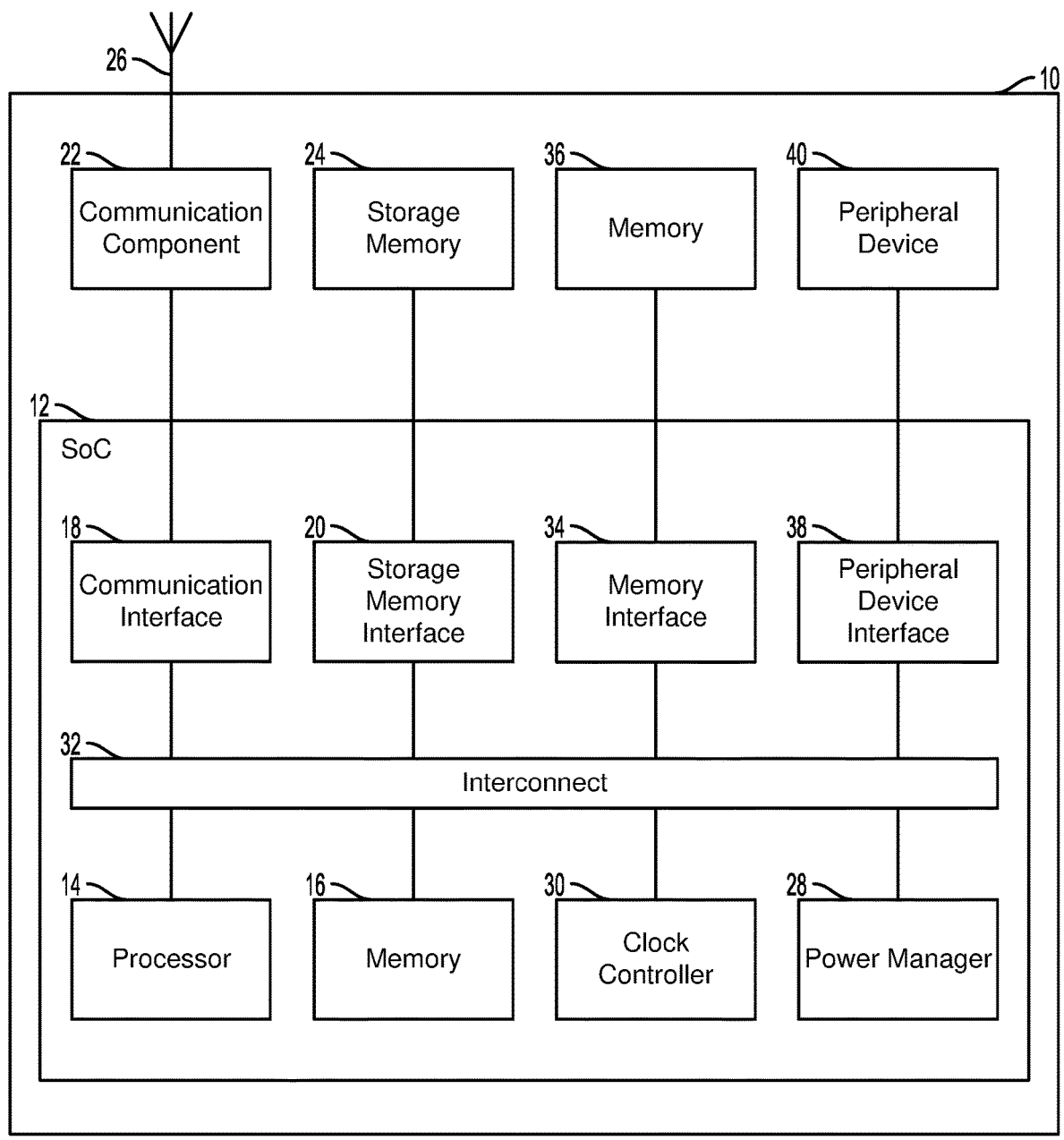
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices implementing such methods of implementing command transactions on a two-wire bus system of a computing device. Embodiments may include a two-wire interface of a host device receiving at least one abort signal via a two-wire bus and transmitting an end signal via the two-wire bus in response to receiving the at least one abort signal. Some embodiments may include a two-wire interface of a bus owner device transmitting at least one command via the two-wire bus prior to receiving the end signal, receiving the end signal via the two-wire bus, and terminating transmission of commands in response to receiving the end signal. Some embodiments may include the two-wire interface of the bus owner device transmitting multiple commands via the two-wire bus following an instance of bus arbitration and prior to a subsequent instance of bus arbitration.

The term "computing device" is used herein to refer to stationary computing devices including personal computers, desktop computers, all-in-one computers, workstations, super computers, mainframe computers, embedded computers (such as in vehicles and other larger systems), computing systems within or configured for use in vehicles, servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of code, e.g., processor-executable instructions, for ease and clarity of explanation, but may be similarly applicable to any data, e.g., code, program data, or other information stored in memory. The terms "code," "data," and "information" are used interchangeably herein and are not intended to limit the scope of the claims and descriptions to the types of code, data, or information used as examples in describing various embodiments.

Current implementations of two-wire bus systems allow communication between multiple devices of a computing device over a shared two-wire bus. A two-wire bus system implements a process of bus arbitration in which the devices having command transactions to implement via the two-wire bus attempt to gain control (or own) the two-wire bus to permit transmitting commands or data. The bus owner device of the two-wire bus may implement one command transaction via the two-wire bus followed by another round of bus arbitration. During the subsequent bus arbitration, the previous bus owner device, if still having a command transaction to implement via the two-wire bus, can attempt to regain control of the two-wire bus. The non-bus owner devices, having a command transaction to implement via the two-wire bus, must wait until the subsequent bus arbitration for another attempt to gain control of the two-wire bus.

Each instance of bus arbitration before each command transaction at the two-wire bus system incur non-negligible time costs. Given that the two-wire bus system can implement only one command transaction at a time, the time cost for each bus arbitration before each command transaction is cumulative over time. The cumulative time cost for one or more processes of the devices connected to the two-wire bus affects the time performance of the processes and the performance perception of a user of the computing device. For example, a process having multiple command transactions incurs the time cost for each bus arbitration for each command transaction, even without interruption for other processes to use the two-wire bus. With interruption for other processes to use the two-wire bus the time cost for the process increases over the time cost without interruption for other processes to use the two-wire bus.

Embodiments of multi-command transactions overcome the foregoing problems by enabling transmission of multiple serial commands by a bus owner device between instances of bus arbitration. A two-wire bus system may be configured to implement multi-command transactions. Two-wire bus interfaces of devices connected to a two-wire bus may be configured to transmit and/or receive abort signals and/or end signals. The abort signal may be configured to trigger transmission of the end signal. The end signal may be configured to trigger termination of transmitting commands by the bus owner device. The two-wire bus interface of the bus owner device may be configured to transmit multiple serial commands until receipt of the end signal rather than transmitting only one command before vying for control of the two-wire bus again in bus arbitration for transmitting a subsequent command.

The two-wire bus system may include multiple devices connected to the two-wire bus. Each of the devices may have a two-wire bus interface configured for communicating via the two-wire bus. The two-wire bus interfaces of the devices may be configured to implement aspects of multi-command transactions. The two-wire bus interfaces of the devices may be configured to transmit multiple serial commands and to transmit abort signals. The two-wire bus interface of a host device may be configured to receive the abort signals and to transmit the end signal in response to receiving an abort signal. The two-wire bus interfaces of the devices may be configured to receive the end signal and terminate transmitting the multiple serial commands in response.

Through bus arbitration by the two-wire bus system, one of the devices may gain control over the two-wire bus, becoming the "bus owner" device with permission to transmit commands over the two-wire bus. Some devices may not vie for control of the two-wire bus during arbitration. Other devices may not win control of the two-wire bus during arbitration. Those devices that do not achieve control of the two-wire bus are "non-bus owners" that do not have permission to transmit commands over the two-wire bus. The bus owner device may transmit at least one command, including multiple serial commands, over the two-wire bus. Any of the devices, the bus owner device and/or the non-bus owner devices, may transmit an abort signal over the two-wire bus. The host device may receive the abort signal and respond by transmitting the end signal over the two-wire bus. The bus owner device may receive the end signal and respond by terminating transmission of commands. Following the bus owner device terminating transmission of commands, the two-wire bus system may implement a subsequent bus arbitration.

In a non-limiting example, during a boot process of a power management integrated circuitry (PMIC), PMIC random access memory (RAM) data may be loaded from a system-on-chip (SoC) to the PMIC via a PMIC interface (e.g., system power management interface (SPMI)). Implementing multi-command transactions during the boot process of the PMIC can reduce the time of the boot process as compared to the boor process implementing single command transactions with bus arbitration implemented for each command transaction. For example, an amount of data of 70,000× bytes of data results in approximately 8500×8-byte SPMI extended register write long commands that may take approximately 41 ms without multi-command transactions. Implementing multi-command transactions, eliminating the repeated bus arbitration, the time to transmit the 70,000× bytes of data may reduce to approximately 37.8 ms, which is an approximately 8% latency reduction.

FIG. 1 illustrates a system including a computing device 10 suitable for use with various embodiments. With reference to FIG. 1, the computing device 10 may include a system-on-chip (SoC) 12 with a processor 14, a memory 16, a communication interface 18, a storage memory interface 20, a memory interface 34, a power manager 28, a clock controller 30, a peripheral device interface 38, and an interconnect 32. The computing device 10 may further include a communication component 22, such as a wired or wireless modem, a storage memory 24, an antenna 26 for establishing a wireless communication link, a memory 36, and a peripheral device 40. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16, 36 for the SoC 12 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM) and/or dynamic RAM (DRAM), or cache memory. These memories 16, 36 may be configured to temporarily hold a limited amount of data received from a data sensor or subsystem, data and/or processor-executable code instructions that are requested from a non-volatile memory 16, 24, loaded to the memories 16, 36 from the non-volatile memory 16, 24 in anticipation of future access based on a variety of factors, and/or intermediary processing data and/or processor-executable code instructions produced by the processor 14 and temporarily stored for future quick access without being stored in non-volatile memory 16, 24. The memory 16, 36 may include multiple physical memory components, such as memory chips, that may be logically combined and/or separated to form the memory 16, 36. The memory interface 34 and the memory 36 may work in unison to allow the computing device 10 to load and retrieve data and processor-executable code on the memory 36.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory 24 may include multiple physical memory components, such as storage memory drives, chips, discs, etc., that may be logically combined and/or separated to form the storage memory 24. The storage memory interface 20 may control access to the storage memory 24 and allow the processor 14 to read data from and write data to the storage memory 24.

The power manager 28 may be configured to control power states of one or more power rails (not shown) for power delivery to the components of the SoC 12. In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. The power manager 28 may be configured as a power management integrated circuit (power management ICs or PMIC).

A clock controller 30 may be configured to control clock signals transmitted to the components of the SoC 12. For example, the clock controller 30 may gate a component of the SoC 12 by disconnecting the component of the SoC 12 from a clock signal and may ungate the component of the SoC 12 by connecting the component of the SoC 12 to the clock signal.

A peripheral device interface 38 may enable components of the SoC 12, such as the processor 14 and/or the memory 16, to communicate with a peripheral device 40. The peripheral device interface 38 may provide and manage physical and logical connections between the components of the SoC 12 and the peripheral device 40. The peripheral device interface 38 may also manage communication between the components of the SoC 12 and the peripheral device 40, such as by directing and/or allowing communications between transmitter and receiver pairs of the components of the SoC 12 and the peripheral device 40 for a communication. The communications may include transmission of memory access commands, addresses, data, interrupt signals, state signals, etc. A peripheral device 40 may be any component of the computing device 10 separate from the SoC 12, such as a processor, a memory, a subsystem, etc. In some embodiments, the peripheral device interface 38 may include a PCIe root complex and may enable PCIe protocol communication between the components of the SoC 12 and the peripheral device 40.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components, including components of the SoC 12, connected to the SoC 12, and the SoC 12, of the computing device 10 may be arranged differently, separated, and/or combined while still serving the functions of the various embodiments. The computing device 10 may not be limited to one of each of the components, and multiple instances of each component may be included in various configurations of the computing device.

Figure 2:
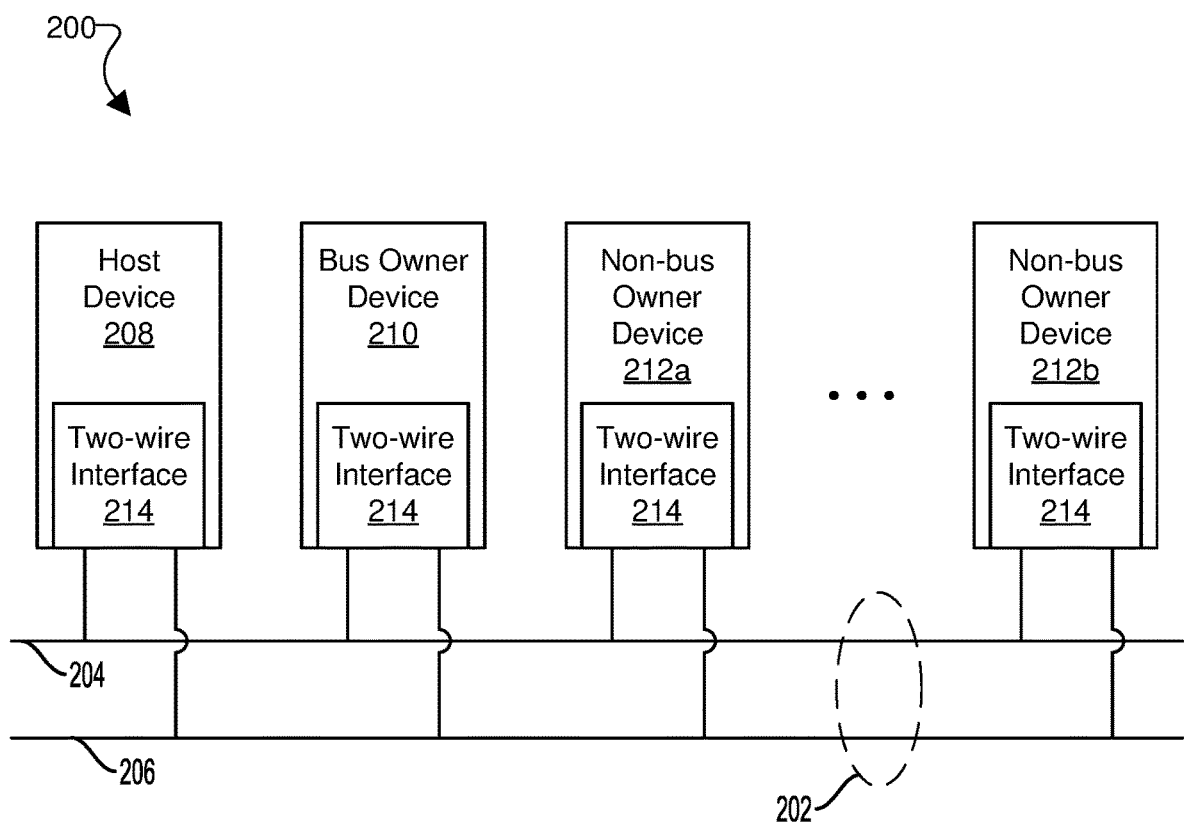
FIG. 2 is a component block diagram illustrating an example two-wire bus system of the computing device suitable for implementing various embodiments.

FIG. 2 illustrates an example two-wire bus system 200 of the computing device (e.g., computing device 10) suitable for implementing various embodiments. With reference to FIGS. 1 and 2, components of the computing device may include components of the two-wire bus system 200, including a two-wire bus 202 (e.g., interconnect 32) connecting multiple devices 208, 210, 212a, 212b (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40). The two-wire bus 202 may include a clock wire 204 and a data wire 206. The clock wire may be configured to transmit a clock signal and the data wire 206 may be configured to transmit data signals.

The multiple devices 208, 210, 212a, 212b may each have a two-wire interface 214, including a processor system of one or more processors (e.g., processor 14), configured to receive signals transmitted by and/or transmit signals over the two-wire bus 202 per a two-wire bus protocol. For example, the two-wire bus protocol may include I²C, SPI, UART, SPMI, etc.

While descriptions of the example of FIG. 2 may be expressed in terms of the multiple devices 208, 210, 212a, 212b, it may be understood that the functions of the multiple devices 208, 210, 212a, 212b of the example may be implemented by the two-wire interfaces 214 of the corresponding devices 208, 210, 212a, 212b.

The multiple devices 208, 210, 212a, 212b may include a host device (e.g., processor 12). Any of the multiple devices 208, 210, 212a, 212b may, at various times, be a bus owner device 210 and/or a non-bus owner device 212a, 212b. The bus owner device 210 is a device that controls, or "owns," the two-wire bus 202 as a result of a bus arbitration process. The non-bus owner devices 212a, 212b are devices that do not control, or do not "own," the two-wire bus 202 as a result of a bus arbitration process, by either not vying for ownership or failing to achieve ownership of the two-wire bus 202. The bus owner device 210 may transmit commands over the data wire 206 of the two-wire bus 202. The non-bus owner devices 212a, 212b may not transmit commands over the data wire 206 of the two-wire bus 202.

The two-wire interface 214 of each of the multiple devices 208, 210, 212a, 212b may be configured to implement multi-command transactions. The two-wire interface 214 of the bus owner device 210 may enable the bus owner device 210 to send at least one command, including multiple commands serially, over the data wire 206 of the two-wire bus 202 between instances of bus arbitration.

The two-wire interface 214 of any of the multiple devices 208, 210, 212a, 212b may enable any of the multiple devices 208, 210, 212a, 212b to generate and transmit an abort signal over the data wire 206 of the two-wire bus 202. The abort signal may be a voltage transition on at least one wire of the two-wire bus. The abort signal may be triggered in response to various events. For example, the bus owner device 210 may generate and transmit an abort signal in response to completing transmitting all of and/or a last of commands the bus owner device 210 has queued. As another example, the non-bus owner device 212a, 212b, which may include the host device 208, may generate and transmit an abort signal in response to having queued a command with a priority level for which the non-bus owner device 212a, 212b is configured to interrupt transmitting one or more commands by the bus owner device 210. The abort signal may be configured to trigger the host device 208 to generate and transmit the end signal.

The two-wire interface 214 of the host device 208 may enable the host device 208 to generate and transmit an end signal over the data wire 206 of the two-wire bus 202. In response to receiving the abort signal from one or more of the multiple devices 208, 210, 212a, 212b over the data wire 206 of the two-wire bus 202, the host device 208 may generate and transmit an end signal. The end signal may be configured to trigger the bus owner device 210 to terminate transmitting commands. The end signal may also be configured to trigger the two-wire bus system 200 to implement bus arbitration to give one or more of the non-bus owner devices 212a, 212b to gain ownership of the two-wire bus 202.

The two-wire interface 214 of the bus owner device 210 may enable the bus owner device 210 to terminate transmitting commands over the data wire 206 of the two-wire bus 202. The bus owner device 210 may receive the end signal and, in response, terminate transmitting any commands that the bus owner device 210 may have queued.

Figure 3A:
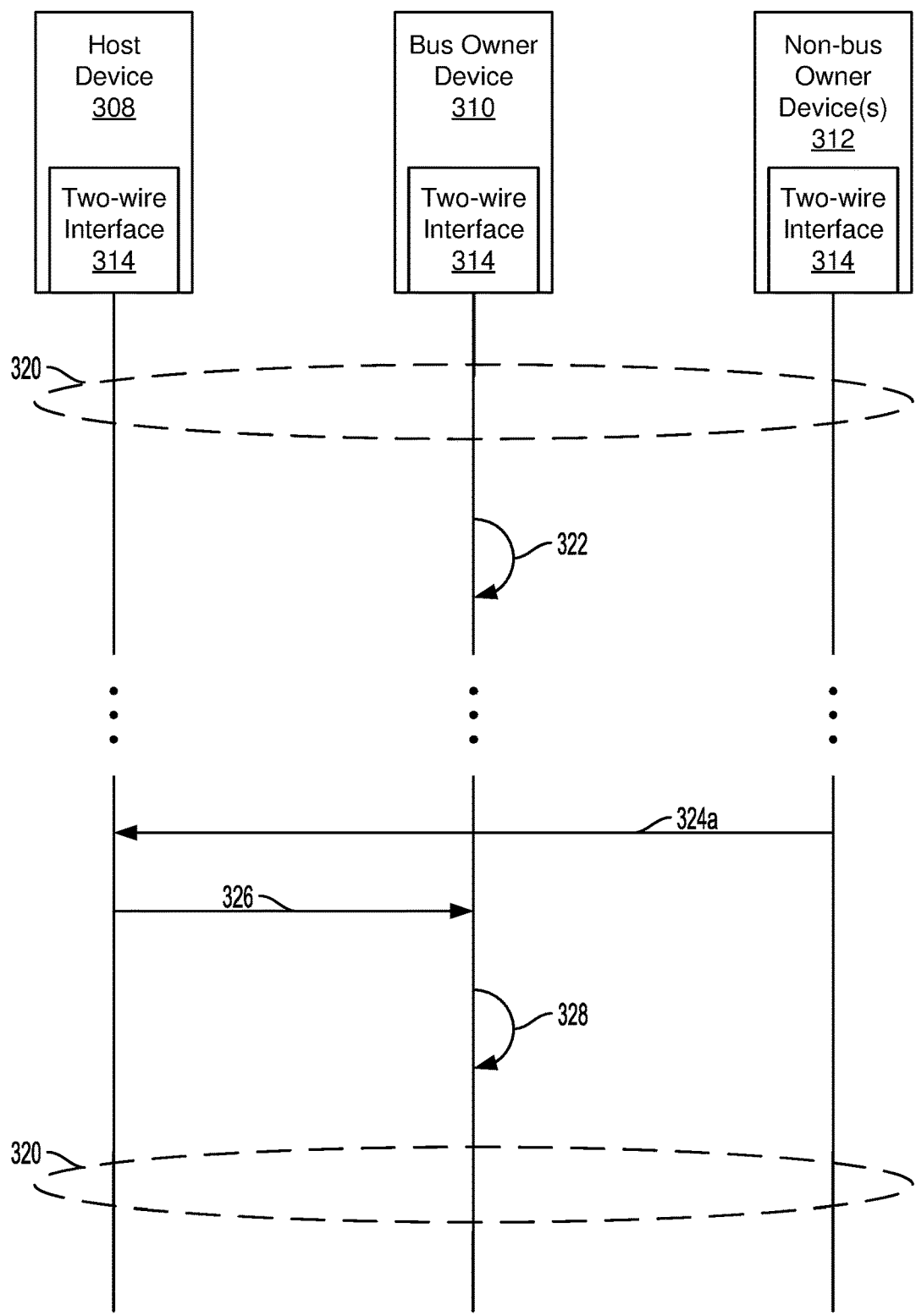
FIGS. 3A-3C are component block and signaling diagrams illustrating examples of multi-command transactions in the two-wire bus system of the computing device suitable for implementing various embodiments.
Figure 3B:
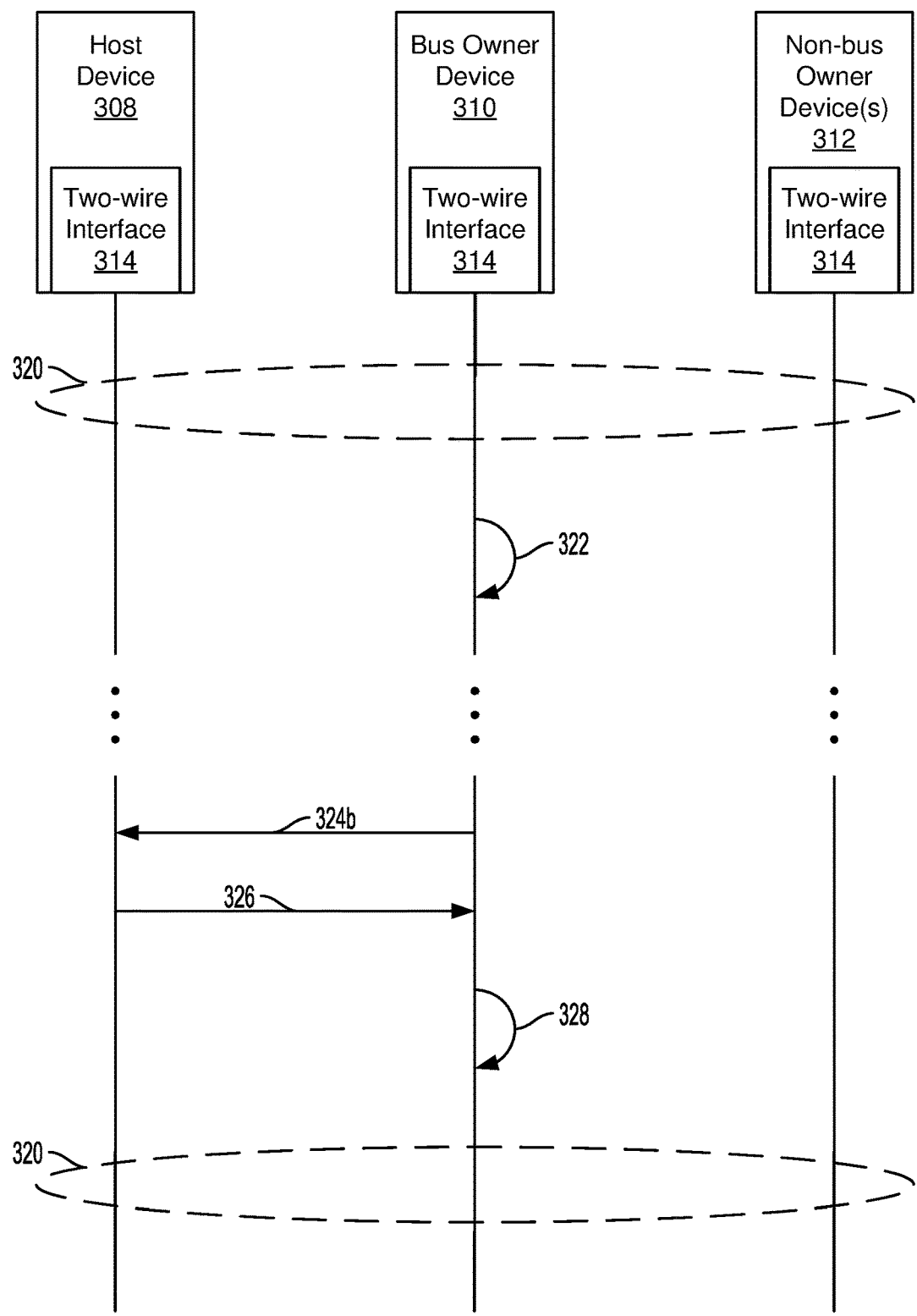
Figure 3C:
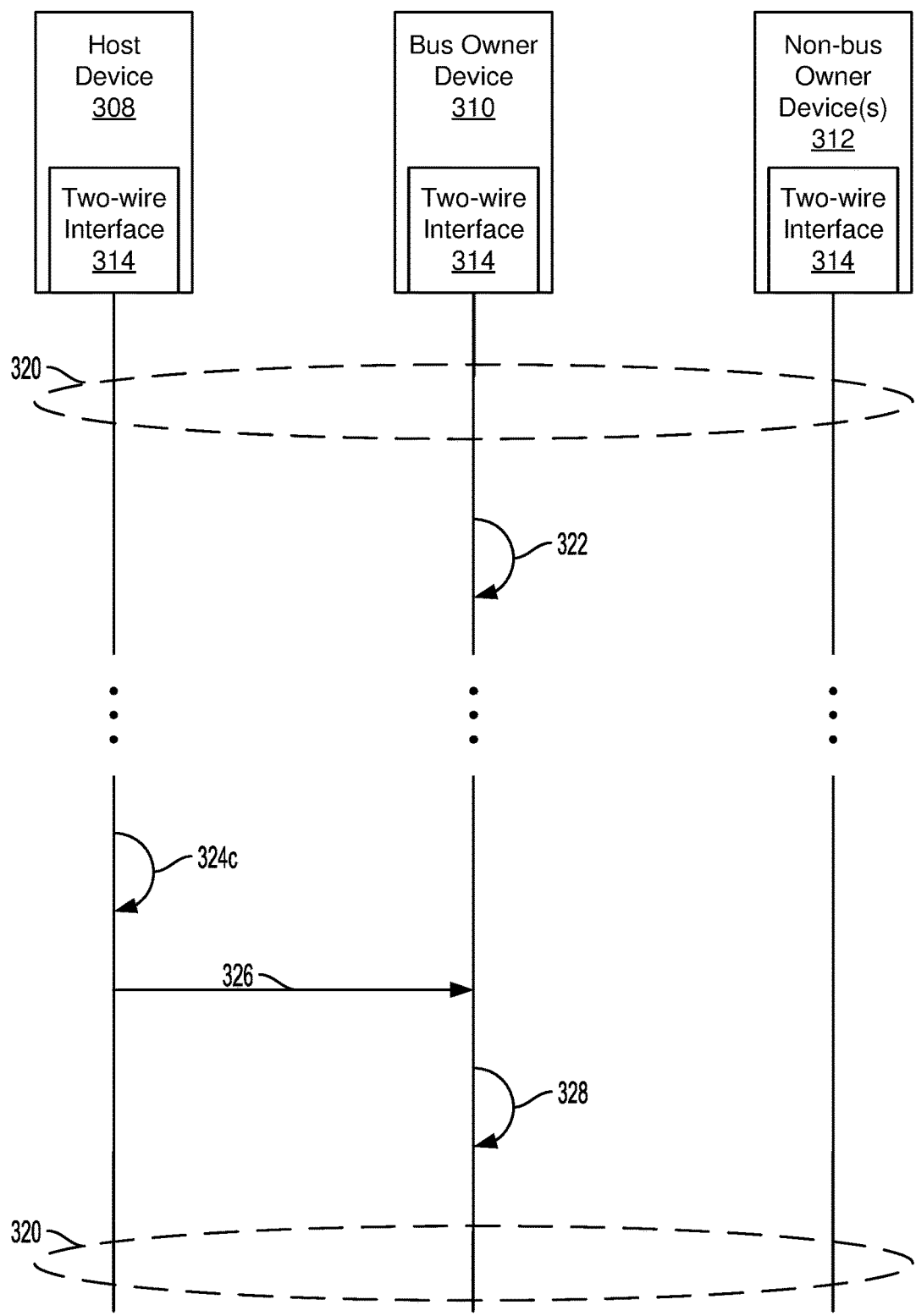

FIGS. 3A-3C illustrate examples of multi-command transactions in the two-wire bus system (e.g., two-wire bus system 200 in FIG. 2) of the computing device (e.g., computing device 10) suitable for implementing various embodiments. With reference to FIGS. 1-3C, multiple devices 308, 310, 312, (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, host device 208, bus owner device 210, non-bus owner device 212a, 212b in FIG. 2) may be configured to implement multi-command transactions over a two-wire bus (e.g., interconnect 32, two-wire bus 202 in FIG. 2). The multiple devices 308, 310, 312 may each have a two-wire interface 314 (e.g., two-wire interface 214 in FIG. 2) to the two wire bus, including a processor system of one or more processors (e.g., processor 14), configured to enable the multiple devices 308, 310, 312 to implement multi-command transactions.

While descriptions of the examples of FIGS. 3A-3C may be expressed in terms of the multiple devices 308, 310, 312, the processes of the examples may be implemented by the two-wire interfaces 314 of the corresponding devices 308, 310, 312.

FIG. 3A illustrates, in process 320, an example instance of bus arbitration on the two-wire bus system in which the bus owner device 310 gains control of the two-wire bus. The bus owner device 310 may transmit at least one command over the two-wire bus in process 322. While the bus owner device 310 has not received an end signal and has at least one command queued for transmission, the bus owner device 310 may continue to serially transmit commands over the two-wire bus.

While the bus owner device 310 continues to serially transmit commands, at least one of multiple non-bus owner devices 312 may generate and transmit an abort signal over the two-wire bus in process 324a. Generating and transmitting the abort signal by the non-bus owner device 312 may be triggered by the non-bus owner device 312 having queued a command to transmit that has a priority for which the non-bus owner device 312 may interrupt the bus-owner device 310 transmitting commands over the two-wire bus.

Also, while the bus owner device 310 continues to serially transmit commands, the host device 308 may receive the abort signal and, in response, generate and transmit an end signal over the two-wire bus in process 326. The bus owner device 310 may receive the end signal and, in response, terminate sending any commands that the bus owner device 310 may have queued for transmission in process 328. As a result of the end signal and termination of transmitting commands by the bus owner device 310, a subsequent instance of bus arbitration on the two-wire bus may be implemented in process 320. The bus owner device 310 may lose and/or relinquish control over and/or ownership of the two-wire bus during bus arbitration. The bus owner device 310 may regain control over and/or ownership of the two-wire bus and/or the non-bus owner device 312 may gain control over and/or ownership of the two-wire bus as a result of the bus arbitration.

FIG. 3B illustrates, in process 320, an example instance of bus arbitration in the two-wire bus system in which the bus owner device 310 gains control of the two-wire bus. The bus owner device 310 may transmit at least one command over the two-wire bus in process 322. While the bus owner device 310 has not received an end signal and has at least one command queued for transmission, the bus owner device 310 may continue to serially transmit commands over the two-wire bus.

The bus owner device 310 may generate and transmit an abort signal over the two-wire bus in process 324b. In some embodiments, the bus owner device 310 may generate the abort signal as a voltage transition on at least one wire of the two-wire bus. Generating and transmitting the abort signal by the bus owner device 310 may be triggered by the bus owner device 310 not having queued a command to transmit.

The host device 308 may receive the abort signal and, in response, generate and transmit an end signal over the two-wire bus in process 326. The bus owner device 310 may receive the end signal and, in response, terminate sending any commands that the bus owner device 310 may have queued for transmission in process 328. As a result of the end signal and termination of transmitting commands by the bus owner device 310, a subsequent instance of bus arbitration may occur in the two-wire bus system in process 320. The bus owner device 310 may lose and/or relinquish control over and/or ownership of the two-wire bus during bus arbitration. The bus owner device 310 may regain control over and/or ownership of the two-wire bus and/or the non-bus owner device 312 may gain control over and/or ownership of the two-wire bus as a result of the bus arbitration.

FIG. 3C illustrates, in process 320, an example instance of bus arbitration in the two-wire bus system in which the bus owner device 310 gains control of the two-wire bus. The bus owner device 310 may transmit at least one command over the two-wire bus in process 322. While the bus owner device 310 has not received an end signal and has at least one command queued for transmission, the bus owner device 310 may continue to serially transmit commands over the two-wire bus.

While the bus owner device 310 continues to serially transmit commands, the host device owner device 308 may generate and transmit an abort signal to the host device owner device 308 in process 324c. Generating and transmitting the abort signal by the host device 308 may be triggered by the host device 308 having queued a command to transmit that has a priority for which the host bus owner device 308 may interrupt the bus-owner device 310 transmitting commands over the two-wire bus.

Also, while the bus owner device 310 continues to serially transmit commands, the host device 308 may receive the abort signal and, in response, generate and transmit an end signal over the two-wire bus in process 326. The bus owner device 310 may receive the end signal and, in response, terminate sending any commands that the bus owner device 310 may have queued for transmission in process 328. As a result of the end signal and termination of transmitting commands by the bus owner device 310, a subsequent instance of bus arbitration may occur in the two-wire bus system in process 320. The bus owner device 310 may lose and/or relinquish control over and/or ownership of the two-wire bus during bus arbitration. The bus owner device 310 may regain control over and/or ownership of the two-wire bus and/or the non-bus owner device 312 may gain control over and/or ownership of the two-wire bus as a result of the bus arbitration.

Figure 4A:
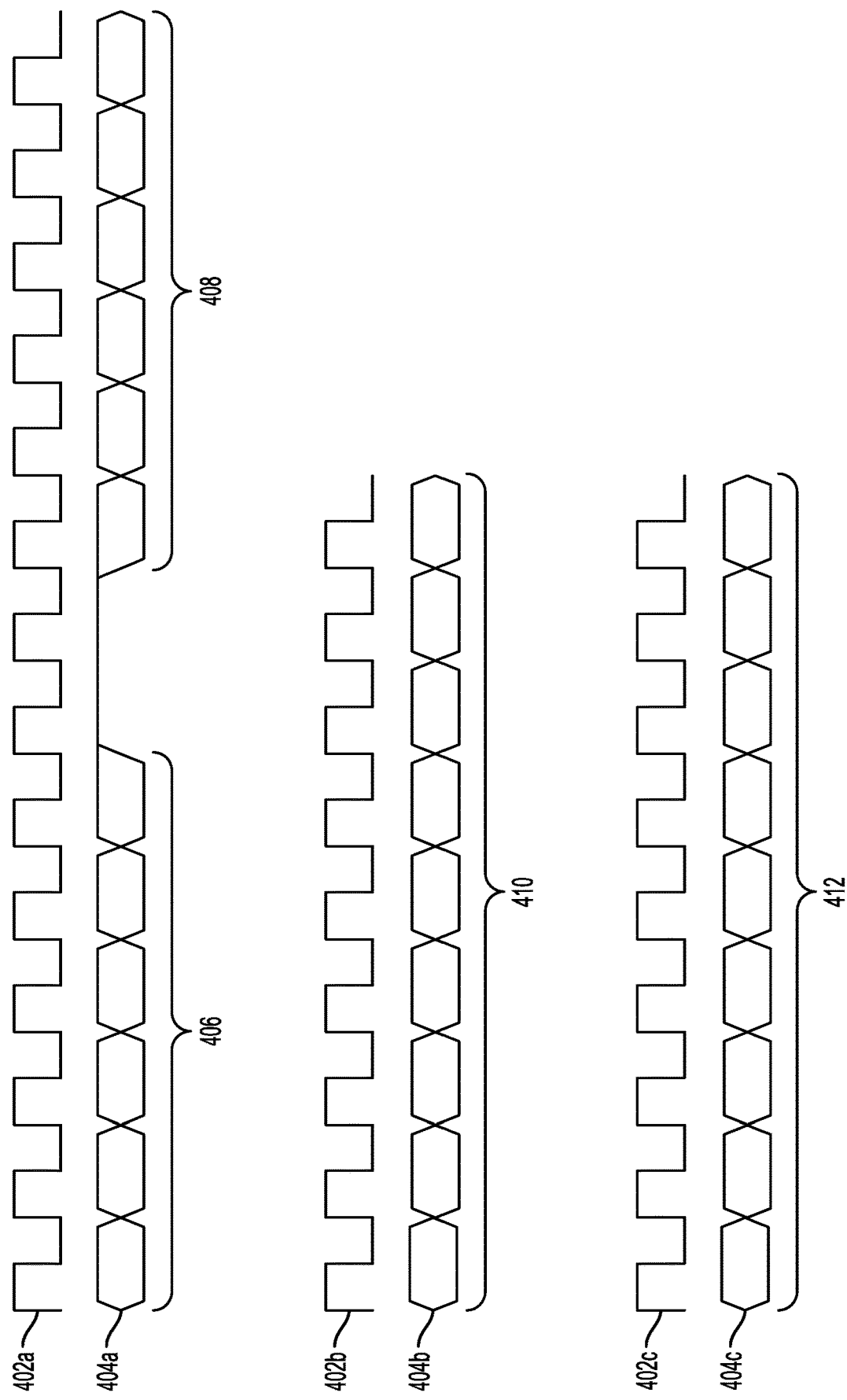
FIGS. 4A-4C are signal and timing diagrams illustrating examples of multi-command transactions in the two-wire bus system of the computing device suitable for implementing various embodiments.
Figure 4B:
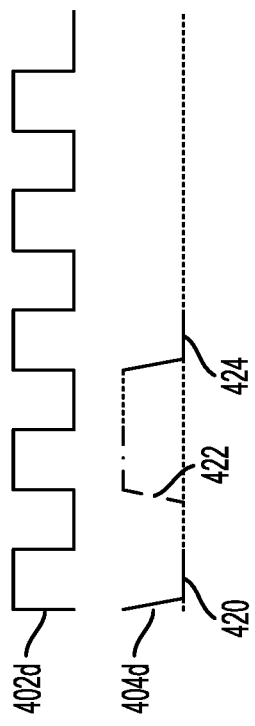
Figure 4C:
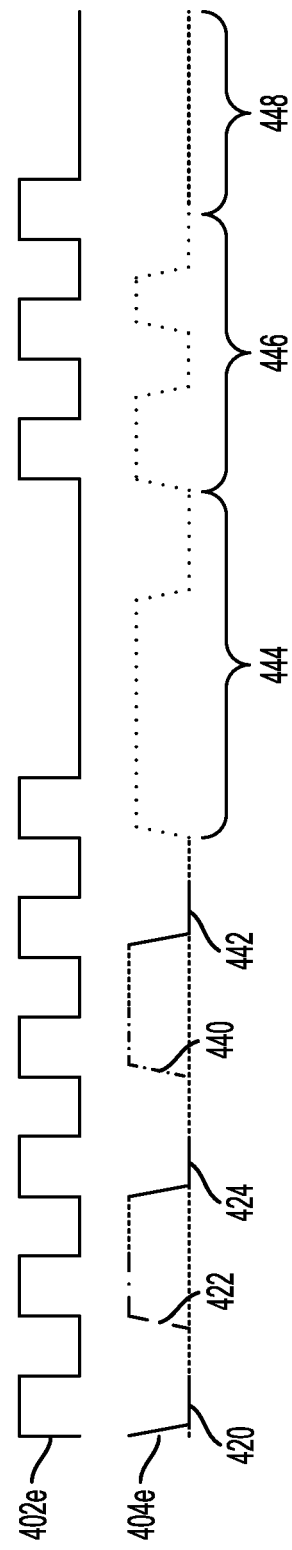

FIGS. 4A-4C illustrate examples of multi-command transactions in a two-wire bus system (e.g., two-wire bus system 200 in FIG. 2) of the computing device (e.g., computing device 10) suitable for implementing various embodiments. With reference to FIGS. 1-4C, multiple devices (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, host device 208, 308, bus owner device 210, 310, non-bus owner device 212a, 212b, 312) may be configured to implement multi-command transactions over a two-wire bus (e.g., interconnect 32, two-wire bus 202, 302). The multiple devices may each have a two-wire interface (e.g., two-wire interface 214, 314), including a processor system of one or more processors (e.g., processor 14), configured to enable the multiple devices to implement multi-command transactions.

Signals may be transmitted via the clock wire (e.g., clock wire 204 in FIG. 2) and data wire (data wire 206) of the two-wire bus by the multiple devices. The clock wire may transmit a clock signal 402a, 402b, 402c, 402d, 402e. The data wire my transmit data signals 404a, 404b, 404c, 404d, 404e.

The examples of FIGS. 4A-4C may be expressed in terms of the multiple devices, it may be understood that the signaling of the examples may be implemented by the two-wire interfaces of the corresponding devices.

The example in FIG. 4A illustrates a command transaction over the two-wire bus as implemented by the bus owner device (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, bus owner device 210, 310). Transmitting a command during a command transaction via the data signals 404a may include transmitting a destination identity 406 and a command 408. The destination identity 406 may identify a targeted non-bus owner device (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, non-bus owner device 212a, 212b, 312) at which to implement the command 408. The command 408 may include the instructions for interpretation by the targeted non-bus owner device for implementing the command 408. In some embodiments, the command 408 may include a parity value configured for error checking. The destination identity 406 and command 408 may be transmitted by the bus owner device and received by the non-bus owner device.

Following transmitting the command 408, data 410 for the command may be transmitted via the data signals 404*b*. The command 408 may be for storing and/or operating on the data 410. In some embodiments, the data 410 may include a parity value configured for error checking. The data 410 may be transmitted by the bus owner device and received by the non-bus owner device.

Following transmitting the data 410, error checking 412 may be implemented by the non-bus owner device. The bus owner device may transmit error checking data and/or commands 412 via the data signals 404*c* for the non-bus owner device to implement error checking for the command 408.

The example in FIG. 4B illustrates abort signal checking when an abort signal is absent. The bus owner device (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, bus owner device 210, 310) may implement bus parking 420, driving the data signals 404*d* low. The non-bus owner device (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, non-bus owner device 212*a*, 212*b*, 312) may transmit an acknowledgement 422 of the command transaction via the data signals 404*d*. The bus owner device may drive the data signals 404*d* low 424 again. The host device (e.g., processor 12, host device 208, 308) may check for an abort signal at the end of or following each command transaction, which in the example of FIG. 4B is not transmitted via the data signals 404*d*.

In some embodiments, the bus owner device may check for the abort signal at the end of or following each command transaction and before implementing a subsequent command transaction, in a repetition of the command transaction illustrated in FIG. 4A. In some embodiments, the bus owner device may be configured to allow time for any of the multiple devices to transmit an abort signal and for the host device to send and end signal before implementing a subsequent command transaction.

A multi-command transaction may include repeating the command transaction illustrated in FIG. 4A and the abort signal check in FIG. 4B in the absence of an abort signal.

The example in FIG. 4C illustrates abort signal checking when an abort signal is present. The bus owner device (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, bus owner device 210, 310) may implement bus parking 420, driving the data signals 404*e* low. The non-bus owner device (e.g., SoC 12, processor 14, memory 16, communication interface 18, storage memory interface 20, communication component 22, storage memory 24, power manager 28, clock controller 30, memory interface 34, memory 36, peripheral device interface 38, peripheral device 40, non-bus owner device 212*a*, 212*b*, 312) may transmit an acknowledgement 422 of the command transaction via the data signals 404*e*. The bus owner device may drive the data signals 404*e* low 424 again.

An abort signal 440 may be transmitted by any of the multiple devices via the data signals 404*e*. The host device (e.g., processor 12, host device 208, 308) may check for the abort signal 440 at the end of or following each command transaction. The host device may check for the abort signal before a subsequent command transaction, in a repetition of the command transaction illustrated in FIG. 4A. The host device may receive the abort signal 440. In some embodiments, the bus owner device may check for the abort signal at the end of or following each command transaction and before implementing a subsequent command transaction. The bus owner device may receive the abort signal 440 and terminate the multi-command transaction, preventing any subsequent command transactions. In some embodiments, the bus owner device may be configured to allow for time for any of the multiple devices to transmit an abort signal and for the host device to send and end signal before implementing a subsequent command transaction. The bus owner device may drive the data signals 404*e* low 442 again.

The host device may implement signaling for a clock handover 444 via the data signals 404*e*. The host device may also transmit an end signal 446 via the data signals 404*e* and that may be received by the bus owner device via the data signals 404*e*. Following transmitting the end signal 446, the two-wire bus may idle 448.

Before implementing another command transaction, as in the example illustrated in FIG. 4A, the two-wire bus system may implement bus arbitration following the abort signal checking when the abort signal is present.

Figure 5:
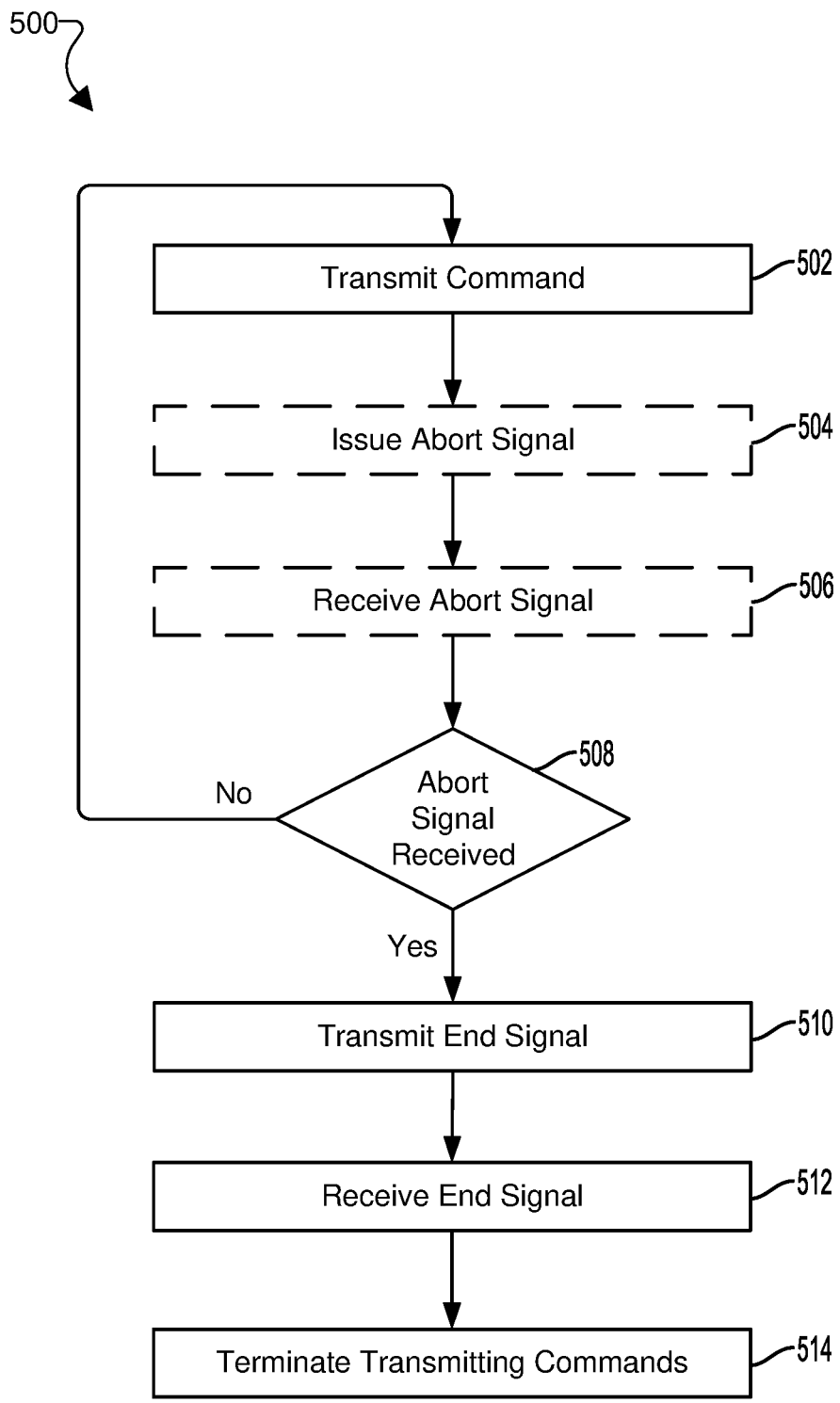
FIG. 5 is a process flow diagram illustrating an example method for implementing multi-command transactions according to an embodiment.

FIG. 5 illustrates an example method for implementing multi-command transactions according to an embodiment. With reference to FIGS. 1-5, the method 500 may be implemented in a computing device (e.g., computing device 10), in hardware (e.g., processor 12, host device 208, 308, bus owner device 210, 310, two-wire interface 214, 314), in software executing in a processor (e.g., processor 12, host device 208, 308, bus owner device 210, 310, two-wire interface 214, 314), or in a combination of a software-configured processor and dedicated hardware, such as the two-wire bus system (e.g., two-wire bus system 200), that includes other individual components, such as various memories/caches. In order to encompass the alternative configurations enabled in various embodiments, the hardware implementing the method 500 is referred to herein as a "multi-command transaction device."

In block 502, the multi-command transaction device may transmit a command (e.g., destination identity 406, command 408, data 410, error checking data and/or commands 412 in FIG. 4A). The command may be sent by multi-command transaction device that owns the two-wire bus (e.g., two-wire bus 202, 302) over the two-wire bus. In some embodiments, the multi-command transaction device transmitting the command in block 502 may be a bus owner device (e.g., bus owner device 210, 310) and/or two-wire interface (e.g., two-wire interface 214, 314), such as a two-wire interface of the bus owner device.

In optional block 504, the multi-command transaction device may issue an abort signal (e.g., abort signal 440). The abort signal may be issued by any configuration of the multi-command transaction device. In some embodiments, the abort signal may be issued internally with the multi-command transaction device. In some embodiments, the abort signal may be transmitted via the two-wire bus. In some embodiments, the abort signal may be issued as a voltage transition on at least one wire of the two-wire bus. For example, the multi-command transaction device that does not own the two-wire buss may issue an abort signal in response to having queued a command with a priority level for which the multi-command transaction device is configured to interrupt transmitting one or more commands by the multi-command transaction device that owns the two-wire bus. As another example, the multi-command transaction device that owns the two-wire bus may issue an abort signal in response to not having queued a command to transmit. Issuing an abort signal in block 504 is optional because issuance of the abort signal is contingent on factors that may or may not occur in various instances. In some embodiments, the multi-command transaction device issuing an abort signal in optional block 504 may be a host device (e.g., processor 12, host device 208, 308), the bus owner device, a non-bus owner device (e.g., non-bus owner device 212a, 212b, 312) and/or the two-wire interface, such as a two-wire interface of the host device, the bus owner device, and/or the non-bus owner device.

In optional block 506, the multi-command transaction device may receive the abort signal. The abort signal may be received via the two-wire bus. In some embodiments, the abort signal may be a voltage transition on at least one wire of the two-wire bus. Receiving the abort signal in block 506 is optional because issuance of the abort signal in block 504 is contingent on factors that may or may not occur in various instances. In some embodiments, the multi-command transaction device receiving the abort signal in optional block 506 may be the host device and/or the two-wire interface, such as a two-wire interface of the host device.

In determination block 508, the multi-command transaction device may determine whether the abort signal is received. There may be instances in which no abort signal was issued and therefore may not be received. There may be instances in which the abort signal was issued and therefore may be received. In some embodiments, the multi-command transaction device determining whether the abort signal is received in determination block 508 may be the host device and/or the two-wire interface, such as a two-wire interface of the host device.

In response to determining that the abort signal is not received (i.e., determination block 508="No"), the multi-command transaction device may transmit a command in block 502. The multi-command transaction device may transmit another command sequentially to a previous command transmitted in a previous implementation of block 502 between which no abort signal or end signal is issued, or bus arbitration is implemented between transmitting of commands. In some embodiments, the multi-command transaction device transmitting the command in block 502 may be the bus owner device and/or the two-wire interface, such as a two-wire interface of the bus owner device. Thus, until an abort signal is received, the multi-command transaction device may transmit a command over the two wire bus.

In response to determining that the abort signal is received (i.e., determination block 508="Yes"), the multi-command transaction device may transmit an end signal (e.g., end signal 446) in block 510. The abort signal may be configured to trigger the multi-command transaction device to generate and transmit the end signal. The end signal may be transmitted via the two-wire bus. In some embodiments, the multi-command transaction device transmitting the end signal in block 510 may be the host device and/or the two-wire interface, such as a two-wire interface of the host device.

In block 512, the multi-command transaction device may receive the end signal. The end signal may be received via the two-wire bus. In some embodiments, the multi-command transaction device receiving the end signal in block 512 may be the bus owner device and/or the two-wire interface, such as a two-wire interface of the bus owner device.

In block 514, the multi-command transaction device may terminate transmitting commands. The end signal may be configured to trigger the multi-command transaction device to terminate transmitting commands. Regardless of whether the multi-command transaction device may have further commands in queue to transmit, the multi-command transaction device may end transmitting the commands in queue until the multi-command transaction device owns the two-wire bus again. In some embodiments, the multi-command transaction device terminating transmission of commands in block 514 may be the bus owner device and/or the two-wire interface, such as a two-wire interface of the bus owner device.

To resume transmitting commands, the multi-command transaction device may have to win a bus arbitration to regain control of the two-wire bus. Winning a bus arbitration may enable the multi-command transaction device to restart the method 500, transmitting a command in block 502.

Figure 6:
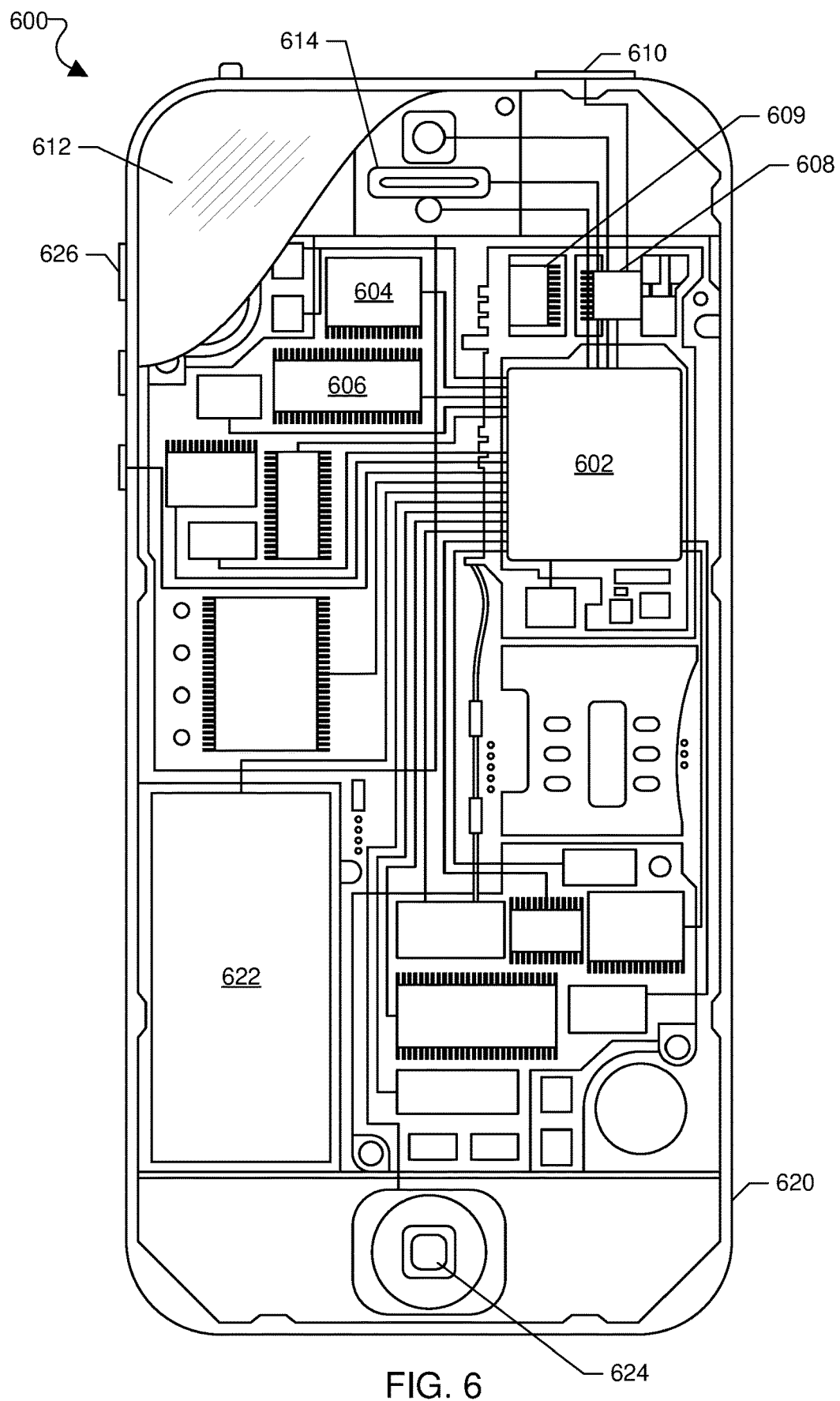
FIG. 6 is a component block diagram illustrating an example mobile computing device suitable for implementing various embodiments.

A system in accordance with the various embodiments (including, but not limited to, embodiments described above with reference to FIGS. 1-5) may be implemented in a wide variety of computing systems including mobile computing devices, an example of which suitable for use with the various embodiments is illustrated in FIG. 6. The mobile computing device 600 may include a processor 602 coupled to a touchscreen controller 604 and an internal memory 606. The processor 602 may be one or more multicore integrated circuits designated for general or specific processing tasks. The internal memory 606 may be volatile or non-volatile memory, and may also be secure and/or encrypted memory, unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM.

The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the mobile computing device 600 need not have touch screen capability.

The mobile computing device 600 may have one or more radio signal transceivers 608 (e.g., Peanut, Bluetooth, ZigBee, Wi-Fi, RF radio) and antennae 610, for sending and receiving communications, coupled to each other and/or to the processor 602. The processor 602 may also be coupled to a cellular network wireless modem 609 that enables communication via a cellular network (e.g., a 5G network) via the antenna 610. The transceivers 608 and antennae 610 may be used with the above-mentioned circuitry to implement the various wireless transmission protocol stacks and interfaces.

The mobile computing device 600 may also include speakers 614 for providing audio outputs. The mobile computing device 600 may also include a housing 620, constructed of a plastic, metal, or a combination of materials, for containing all or some of the components described herein. The mobile computing device 600 may include a power source 622 coupled to the processor 602, such as a disposable or rechargeable battery. The rechargeable battery may also be coupled to the peripheral device connection port to receive a charging current from a source external to the mobile computing device 600. The mobile computing device 600 may also include a physical button 624 for receiving user inputs. The mobile computing device 600 may also include a power button 626 for turning the mobile computing device 600 on and off.

Figure 7:
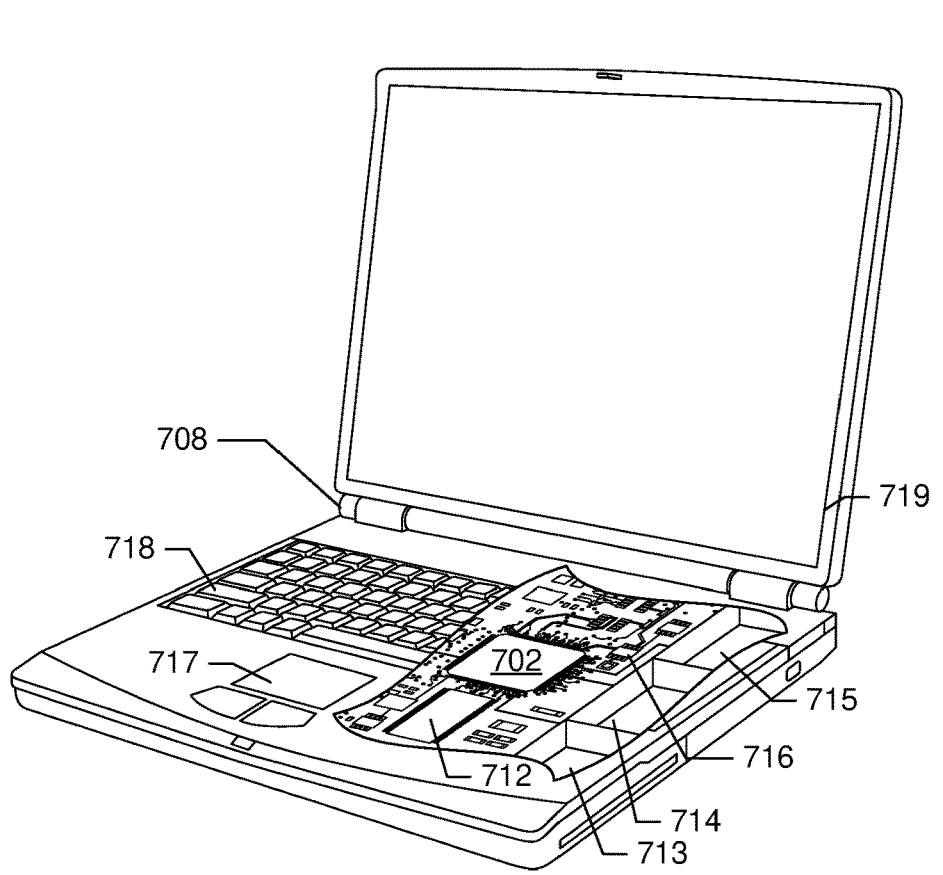
FIG. 7 is a component block diagram illustrating an example mobile computing device suitable for implementing various embodiments.

A system in accordance with the various embodiments (including, but not limited to, embodiments described above with reference to FIGS. 1-5) may be implemented in a wide variety of computing systems including a laptop computer 700, an example of which is illustrated in FIG. 7. Many laptop computers include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. In a notebook configuration, the computer housing includes the touchpad 717, the keyboard 718, and the display 719 all coupled to the processor 702. Other configurations of the computing device may include a computer mouse or trackball coupled to the processor (e.g., via a USB input) as are well known, which may also be used in conjunction with the various embodiments.

Figure 8:
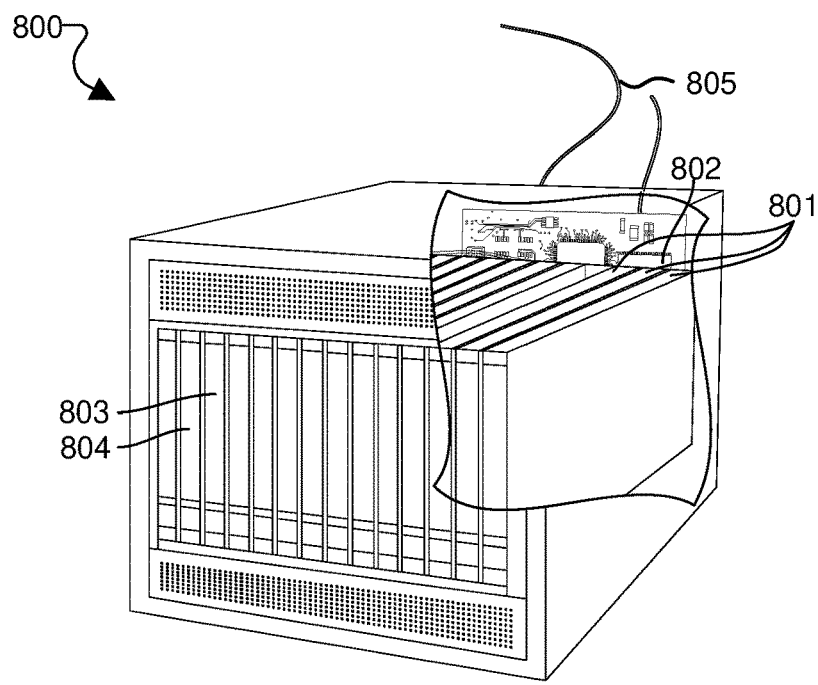
FIG. 8 is a component block diagram illustrating an example general purpose computing system suitable for implementing various embodiments.

A system in accordance with the various embodiments (including, but not limited to, embodiments described above with reference to FIGS. 1-5) may also be implemented in fixed computing systems, such as any of a variety of generalized or specialize computing systems, including computing systems that may be implemented in vehicles. An example computing system 800 is illustrated in FIG. 8. Such a computing system 800 typically includes one or more multicore processor assemblies 801 coupled to volatile memory 802 and a large capacity nonvolatile memory, such as a non-volatile disk drive 804. The computing system 800 may include network access ports 803 coupled to the multicore processor assemblies 801 for establishing network interface connections with a network 805, such as a local area network, a vehicle network bus, and other networks.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices; the example systems, devices, or methods discussed in the following paragraphs implemented by a computing device comprising a processing device and/or a memory subsystem scan dump device configured with processing device-executable instructions to perform operations of the example systems, devices, or methods; the example systems, devices, or methods discussed in the following paragraphs implemented by a memory subsystem scan dump device configured to perform operations of the example systems, devices, or methods; the example systems, devices, or methods discussed in the following paragraphs implemented by a computing device comprising a memory subsystem scan dump device configured to perform operations of the example systems, devices, or methods; the example systems, devices, or methods discussed in the following paragraphs implemented by a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. Example 1. A method of implementing command transactions on a two-wire bus system of a computing device, including: receiving, by a two-wire interface of a host device, at least one abort signal via a two-wire bus; and transmitting, by the two-wire interface of the host device, an end signal via the two-wire bus in response to receiving the at least one abort signal.

Example 2. The method of example 1, further including: transmitting, by a two-wire interface of a bus owner device, at least one command via the two-wire bus prior to receiving the end signal; receiving, by the two-wire interface of the bus owner device, the end signal via the two-wire bus; and terminating, by the two-wire interface of the bus owner device, transmission of commands on the two-wire bus in response to receiving the end signal.

Example 3. The method of example 2, in which transmitting, by the two-wire interface of the bus owner device, the at least one command via the two-wire bus prior to receiving the end signal includes transmitting a plurality of commands, including the at least one command, following an instance of bus arbitration and prior to a subsequent instance of bus arbitration.

Example 4. The method of either of examples 2 or 3, in which the bus owner device is a power management integrated circuit (PMIC).

Example 5. The method of any of examples 1-4, in which receiving, by the two-wire interface of the host device, the at least one abort signal via the two-wire bus includes receiving the at least one abort signal from a two-wire interface of a bus owner device.

Example 6. The method of any of examples 1-4, in which receiving, by the two-wire interface of the host device, the at least one abort signal via the two-wire bus includes receiving the at least one abort signal from a two-wire interface of at least one non-bus owner device.

Example 7. The method of any of examples 1-6, in which the at least one abort signal is a voltage transition on at least one wire of the two-wire bus.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A computing device, comprising:
   a two-wire bus;
   a host device including a two-wire interface coupled to the two-wire bus; and
   a bus owner device including a two-wire interface coupled to the two-wire bus,
   wherein the two-wire interface of the host device is configured to:
     receive at least one abort signal via the two-wire bus; and
     transmit an end signal via the two-wire bus in response to receiving the at least one abort signal; and
   wherein the two-wire interface of the bus owner device is configured to:
     transmit at least one command via the two-wire bus prior to receiving the end signal;
     receive the end signal via the two-wire bus; and
     terminate transmission of commands on the two-wire bus in response to receiving the end signal.

2. The computing device of claim 1, wherein the two-wire interface of the bus owner device is configured to transmit a plurality of commands, including the at least one command, following an instance of bus arbitration and prior to a subsequent instance of bus arbitration.

3. The computing device of claim 1, wherein the bus owner device is a power management integrated circuit (PMIC).

4. The computing device of claim 1, wherein the two-wire interface of the host device is configured to receive the at least one abort signal from the two-wire interface of the bus owner device.

5. The computing device of claim 1, wherein the two-wire interface of the host device is configured to receive the at least one abort signal from a two-wire interface of at least one non-bus owner device.

6. The computing device of claim 1, wherein the at least one abort signal is a voltage transition on at least one wire of the two-wire bus.

7. A method of implementing command transactions on a two-wire bus system of a computing device, comprising:
   receiving, by a two-wire interface of a host device, at least one abort signal via a two-wire bus; and
   transmitting, by the two-wire interface of the host device, an end signal via the two-wire bus in response to receiving the at least one abort signal;
   transmitting, by a two-wire interface of a bus owner device, at least one command via the two-wire bus prior to receiving the end signal;
   receiving, by the two-wire interface of the bus owner device, the end signal via the two-wire bus; and
   terminating, by the two-wire interface of the bus owner device, transmission of commands on the two-wire bus in response to receiving the end signal.

8. The method of claim 7, wherein transmitting, by the two-wire interface of the bus owner device, the at least one command via the two-wire bus prior to receiving the end signal comprises transmitting a plurality of commands, including the at least one command, following an instance of bus arbitration and prior to a subsequent instance of bus arbitration.

9. The method of claim 7, wherein the bus owner device is a power management integrated circuit (PMIC).

10. The method of claim 7, wherein receiving, by the two-wire interface of the host device, the at least one abort signal via the two-wire bus comprises receiving the at least one abort signal from a two-wire interface of a bus owner device.

11. The method of claim 7, wherein receiving, by the two-wire interface of the host device, the at least one abort signal via the two-wire bus comprises receiving the at least one abort signal from a two-wire interface of at least one non-bus owner device.

12. The method of claim 7, wherein the at least one abort signal is a voltage transition on at least one wire of the two-wire bus.

13. A computing device, comprising:
- a two-wire bus communicatively coupling a host device to a bus owner device;
- means for receiving at least one abort signal via the two-wire bus; and
- means for transmitting an end signal via the two-wire bus in response to receiving the at least one abort signal
- means for transmitting at least one command via the two-wire bus prior to receiving the end signal;
- means for receiving the end signal via the two-wire bus; and
- means for terminating transmission of commands on the two-wire bus in response to receiving the end signal.

14. The computing device of claim 13, wherein means for transmitting the at least one command via the two-wire bus prior to receiving the end signal comprises means for transmitting a plurality of commands, including the at least one command, following an instance of bus arbitration and prior to a subsequent instance of bus arbitration.

15. The computing device of claim 13, wherein the bus owner device is a power management integrated circuit (PMIC).

16. The computing device of claim 13, wherein means for receiving the at least one abort signal via the two-wire bus comprises means for receiving the at least one abort signal from a two-wire interface of the bus owner device.

17. The computing device of claim 13, wherein means for receiving the at least one abort signal via the two-wire bus comprises means for receiving the at least one abort signal from a two-wire interface of at least one non-bus owner device.

* * * * *